US009874402B2

(12) United States Patent
Ishikawa et al.

(10) Patent No.: US 9,874,402 B2
(45) Date of Patent: Jan. 23, 2018

(54) HEAT EXCHANGER, REFRIGERATION CYCLE APPARATUS, AND METHOD OF MANUFACTURING HEAT EXCHANGER

(71) Applicant: Mitsubishi Electric Corporation, Tokyo (JP)

(72) Inventors: Tomotaka Ishikawa, Tokyo (JP); Sangmu Lee, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 253 days.

(21) Appl. No.: 14/774,171

(22) PCT Filed: Dec. 27, 2013

(86) PCT No.: PCT/JP2013/085169
§ 371 (c)(1),
(2) Date: Sep. 10, 2015

(87) PCT Pub. No.: WO2014/147919
PCT Pub. Date: Sep. 25, 2014

(65) Prior Publication Data
US 2016/0025415 A1    Jan. 28, 2016

(30) Foreign Application Priority Data

Mar. 21, 2013    (WO) .................. PCT/JP2013/058060

(51) Int. Cl.
*F28D 1/04*    (2006.01)
*F28D 1/02*    (2006.01)
(Continued)

(52) U.S. Cl.
CPC ............ *F28D 1/0233* (2013.01); *B23P 15/26* (2013.01); *F28D 1/047* (2013.01); *F28D 1/053* (2013.01);
(Continued)

(58) Field of Classification Search
CPC ........ F28D 1/0233; F28D 1/047; F28D 1/053; F28D 2021/007; F28D 2021/0071;
(Continued)

(56) References Cited

U.S. PATENT DOCUMENTS 1,874,009 A * 8/1932 Henshall ............... F28D 1/0535
165/147
4,316,503 A * 2/1982 Kurachi ............. F28D 1/05333
165/175
(Continued)

FOREIGN PATENT DOCUMENTS

CN    102016482 A    4/2011
JP    H02-309195 A    12/1990
(Continued)

OTHER PUBLICATIONS

International Search Report of the International Searching Authority dated Mar. 11, 2014 for the corresponding international application No. PCT/JP2013/085169 (and English translation).
(Continued)

*Primary Examiner* — Justin Jonaitis
(74) *Attorney, Agent, or Firm* — Posz Law Group, PLC

(57) ABSTRACT

A heat exchanger includes a plurality of fins spaced apart from each other such that gas flows therebetween, and a plurality of heat transfer tubes extending through the plurality of fins and joined to the plurality of fins by tube expansion. The heat transfer tubes are arranged in five or more columns along a flow direction of the gas and staggered in a row direction intersecting the flow direction of the gas. Each of the plurality of fins is flat and plate-shaped and continuously extends between the heat transfer tubes in the flow direction of the gas. The plurality of heat transfer tubes satisfy relationships of $1.055D \leq Da \leq 1.068D$ and $1.56Da \leq L \leq 2.58Da$, where D is an unexpanded outside diameter of the heat transfer tubes, Da is an expanded
(Continued)

outside diameter thereof, and L is a distance between centers of adjacent two heat transfer tubes.

7 Claims, 4 Drawing Sheets

(51) Int. Cl.
| | | |
|---|---|---|
| *F28F 1/40* | (2006.01) | |
| *F28F 1/32* | (2006.01) | |
| *F28F 1/42* | (2006.01) | |
| *F28F 21/08* | (2006.01) | |
| *F28D 1/047* | (2006.01) | |
| *B23P 15/26* | (2006.01) | |
| *F28D 1/053* | (2006.01) | |
| *F28F 1/38* | (2006.01) | |
| *F28F 1/30* | (2006.01) | |
| *F28D 21/00* | (2006.01) | |

(52) U.S. Cl.
CPC ............... *F28F 1/30* (2013.01); *F28F 1/32* (2013.01); *F28F 1/38* (2013.01); *F28F 1/40* (2013.01); *F28F 1/42* (2013.01); *F28F 21/085* (2013.01); *F28D 2021/007* (2013.01); *F28D 2021/0071* (2013.01); *F28F 2275/125* (2013.01)

(58) Field of Classification Search
CPC ..... B23P 15/26; F28F 1/30; F28F 1/32; F28F 1/38; F28F 1/40; F28F 1/42; F28F 21/085; F28F 2275/125
USPC ........................................................ 165/151
See application file for complete search history.

(56) References Cited

U.S. PATENT DOCUMENTS

| | | | | | |
|---|---|---|---|---|---|
| 4,459,917 | A | * | 7/1984 | Michael | B21D 53/085 |
| | | | | | 165/150 |
| 4,502,532 | A | * | 3/1985 | Tomozaki | F28F 9/182 |
| | | | | | 165/150 |
| 4,706,355 | A | * | 11/1987 | Kuhns | B21C 37/22 |
| | | | | | 29/727 |
| 4,791,274 | A | * | 12/1988 | Horst | F24H 3/004 |
| | | | | | 165/55 |
| 5,267,610 | A | * | 12/1993 | Culbert | B21D 53/085 |
| | | | | | 165/151 |
| 5,535,820 | A | * | 7/1996 | Beagle | F28F 1/32 |
| | | | | | 165/150 |
| 2010/0218533 | A1 | * | 9/2010 | Lee | B21D 53/08 |
| | | | | | 62/259.1 |
| 2011/0000254 | A1 | * | 1/2011 | Lee | F25B 39/00 |
| | | | | | 62/498 |
| 2011/0113820 | A1 | * | 5/2011 | Lee | F25B 39/00 |
| | | | | | 62/498 |

FOREIGN PATENT DOCUMENTS

| | | | |
|---|---|---|---|
| JP | H03-010721 A | | 1/1991 |
| JP | 2604722 B2 | | 1/1997 |
| JP | 2000-274982 A | | 10/2000 |
| JP | 2001-221587 A | | 8/2001 |
| JP | 2009-097785 A | | 5/2009 |
| JP | 2010-078289 A | | 4/2010 |
| JP | 2010-214404 A | | 9/2010 |
| JP | 2010214404 A | * | 9/2010 |
| JP | 2012-093073 A | | 5/2012 |
| JP | 2012093073 A | * | 5/2012 |
| WO | 2009/131072 A1 | | 10/2009 |

OTHER PUBLICATIONS

Office Action dated Jun. 7, 2016 issued in corresponding JP patent application No. 2015-506562 (and English translation).
Office Action dated Nov. 1, 2016 issued in corresponding Chinese patent application No. 201380074903.8 (and English translation).
Office Action dated Jan. 10, 2017 issued in corresponding Japanese patent application No. 2015-506562 (and English translation).
Office Action dated May 3, 2017 issued in corresponding CN patent application No. 201380074901.8 (and English translation).

* cited by examiner

HEATING
COOLING

DISTANCE (L) BETWEEN CENTERS OF HEAT TRANSFER TUBES / EXPANDED OUTSIDE DIAMETER (Da)

NUMBER (N) OF PROTRUSIONS / UNEXPANDED OUTSIDE DIAMETER (D)

FIN PITCH (Fp) / UNEXPANDED OUTSIDE DIAMETER (D)

HEAT EXCHANGER, REFRIGERATION CYCLE APPARATUS, AND METHOD OF MANUFACTURING HEAT EXCHANGER

CROSS REFERENCE TO RELATED APPLICATION

This application is a U.S. national stage application of International Application No. PCT/JP2013/085169 filed on Dec. 27, 2013, which claims priority to International Application No. PCT/JP2013/058060 filed on Mar. 21, 2013, the disclosures of which are incorporated herein by reference.

TECHNICAL FIELD

The present invention relates to a heat exchanger including heat transfer tubes, a refrigeration cycle apparatus including the heat exchanger, and a method of manufacturing the heat exchanger.

BACKGROUND ART

A heat exchanger known in the art includes a plurality of fins spaced apart such that gas (e.g., air) flows through spaces defined by the fins, and a plurality of heat transfer tubes through which a medium (e.g., refrigerant) flows and which extend through the fins.

A technique has been proposed to improve heat transfer performance of such a heat exchanger by optimizing a column pitch and a row pitch of the heat transfer tubes and arranging slits in the fins (refer to Patent Literature 1, for example).

CITATION LIST

Patent Literature

Patent Literature 1: Japanese Patent No. 2604722 (FIG. 1)

SUMMARY OF INVENTION

Technical Problem

In fixing a heat transfer tube to fins in the art heat exchanger by tube expansion, a reduction in degree of contact between an outer surface of the heat transfer tube and the fin causes a deterioration in heat transfer performance of the heat exchanger, resulting in a reduction in heat exchanging capacity.

As regards materials of fins and heat transfer tubes of heat exchangers, copper-containing metals, such as copper and copper alloy, have been used in consideration of, for example, recyclability and resistance to corrosion.

Copper-containing metals have low resistance to deformation. In expanding a heat transfer tube to fix the heat transfer tube to fins, the degree of contact between an outer surface of the heat transfer tube and the fins is reduced, leading to a reduction in heat transfer rate. Thus, a deterioration in heat transfer performance of a heat exchanger is caused, resulting in a reduction in heat exchanging capacity.

The present invention has been made to overcome the above-described disadvantage and aims to provide a heat exchanger and a refrigeration cycle apparatus, in both of which a reduction in heat exchanging capacity is reduced, and a method of manufacturing the heat exchanger.

Solution to Problem

The present invention provides a heat exchanger including a plurality of fins spaced apart from each other such that gas flows through spaces defined by the plurality of fins, and a plurality of heat transfer tubes extending through the plurality of fins and joined to the plurality of fins by tube expansion. The plurality of heat transfer tubes are arranged in five or more columns in a column arrangement direction along a flow direction of the gas and are arranged in a staggered pattern in a row arrangement direction intersecting the flow direction of the gas. Each of the plurality of fins is flat and plate-shaped and continuously extends between the plurality of heat transfer tubes in the column arrangement direction. The plurality of heat transfer tubes satisfy the relationships of $1.055D \leq Da \leq 1.068D$ and $1.56Da \leq L \leq 2.58Da$, where D is an unexpanded outside diameter of the plurality of heat transfer tubes, Da is an expanded outside diameter thereof, and L is a distance between centers of adjacent two of the plurality of heat transfer tubes.

Advantageous Effects of Invention

According to the present invention, a reduction in the degree of contact between outer surfaces of the heat transfer tubes and the fins can be reduced. Furthermore, a reduction in heat exchanging capacity of the heat exchanger can be reduced.

DESCRIPTION OF EMBODIMENTS

Embodiment 1

Figure 1:
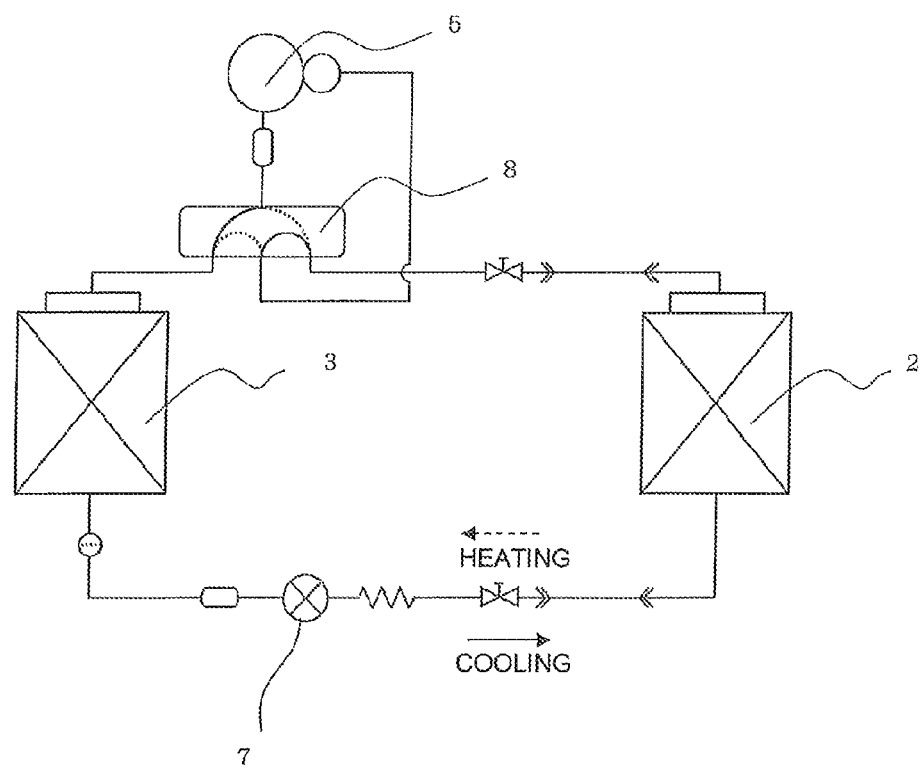
FIG. 1 is a diagram illustrating the configuration of an air-conditioning apparatus according to Embodiment 1 of the present invention.

FIG. 1 is a diagram illustrating the configuration of an air-conditioning apparatus according to Embodiment 1 of the present invention.

In Embodiment 1, the air-conditioning apparatus will be described as an example of a refrigeration cycle apparatus according to the present invention.

As illustrated in FIG. 1, the air-conditioning apparatus includes a refrigerant circuit, through which refrigerant is circulated, sequentially connecting, by refrigerant pipes, a compressor 5, a four-way valve 8, an outdoor side heat exchanger 3, an expansion valve 7, and an indoor side heat exchanger 2. The expansion valve 7 corresponds to an "expansion unit" in the present invention.

The four-way valve 8 switches between refrigerant flow directions in the refrigerant circuit to switch between a heating operation and a cooling operation. When the air-conditioning apparatus is designed for cooling or heating only, the four-way valve 8 may be omitted.

The indoor side heat exchanger 2 is installed in an indoor unit. The indoor side heat exchanger 2 functions as a refrigerant evaporator in the cooling operation. The indoor side heat exchanger 2 functions as a refrigerant condensor in the heating operation.

The outdoor side heat exchanger 3 is installed in an outdoor unit. The outdoor side heat exchanger 3 functions as a condensor to heat, for example, air with heat from the refrigerant in the cooling operation. The outdoor side heat exchanger 3 functions as an evaporator to evaporate the refrigerant and cool, for example, air with heat of vaporization in the heating operation.

The compressor 5 compresses the refrigerant discharged from the evaporator to a high temperature state and supplies the refrigerant to the condensor.

The expansion valve 7 expands the refrigerant discharged from the condensor to a low temperature state and supplies the refrigerant to the evaporator.

As regards the refrigerant, any one of a single-component refrigerant of HC, a refrigerant mixture containing HC, R32, R410A, R407C, carbon dioxide, R1234yf, a refrigerant mixture containing at least R1234yf, R1234ze, and a refrigerant mixture containing at least R1234ze is used.

These refrigerants allow a heat transfer tube 20 to have a small intratube pressure loss. The use of any of the above-described refrigerants allows an improvement in intratube heat transfer performance of the heat transfer tube 20 with no increase in intratube pressure loss in the heat transfer tube 20. Consequently, a highly efficient heat exchanger 1 can be provided. In particular, when the heat transfer tube 20 has a small diameter, the above-described effect is noticeable, because a bottom part of a groove 21, which will be described later, of the heat transfer tube 20 must be thick.

In the following description, the indoor side heat exchanger 2 and the outdoor side heat exchanger 3 will be collectively referred to as a heat exchanger 1 when these heat exchangers are not distinguished from each other.

Figure 2:
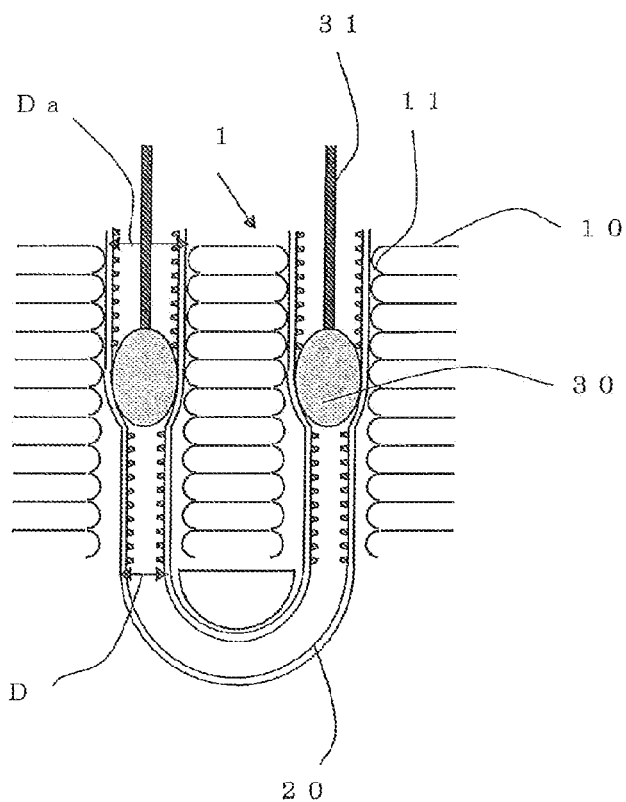
FIG. 2 is a diagram illustrating a state of a tube expanded by mechanical tube expansion.

FIG. 2 is a diagram illustrating a state of a tube expanded by mechanical tube expansion.

Mechanical tube expansion is to insert a rod 31 having at its tip an expanding ball 30 with a diameter slightly larger than an inside diameter of the heat transfer tube 20 into the heat transfer tube 20, increase an outside diameter of the heat transfer tube 20, and join the heat transfer tube 20 to fins 10 such that they are in close contact.

As illustrated in FIG. 2, an unexpanded outside diameter of the heat transfer tube 20 is defined as D, and an expanded outside diameter thereof is defined as Da.

An exemplary method of manufacturing the heat exchanger 1 in Embodiment 1 will now be described.

A central part in a longitudinal direction of the heat transfer tube 20 is bent into a hair pin shape at a predetermined bending pitch.

Through holes are formed in each of the fins 10, and the fins 10 are spaced apart from each other. A fin collar 11 is provided for each of the through holes of the fins 10.

The heat transfer tube 20 is inserted into the through holes of the fins 10 spaced apart.

The heat transfer tube 20 is expanded by mechanical tube expansion, an outer surface of the heat transfer tube 20 is brought into close contact with the fin collars 11 of the fins 10, and the heat transfer tube 20 is joined to the fins 10.

Although FIG. 2 illustrates the heat transfer tube 20 bent in a hair pin shape, the present invention is not limited to such a case.

Figure 3:
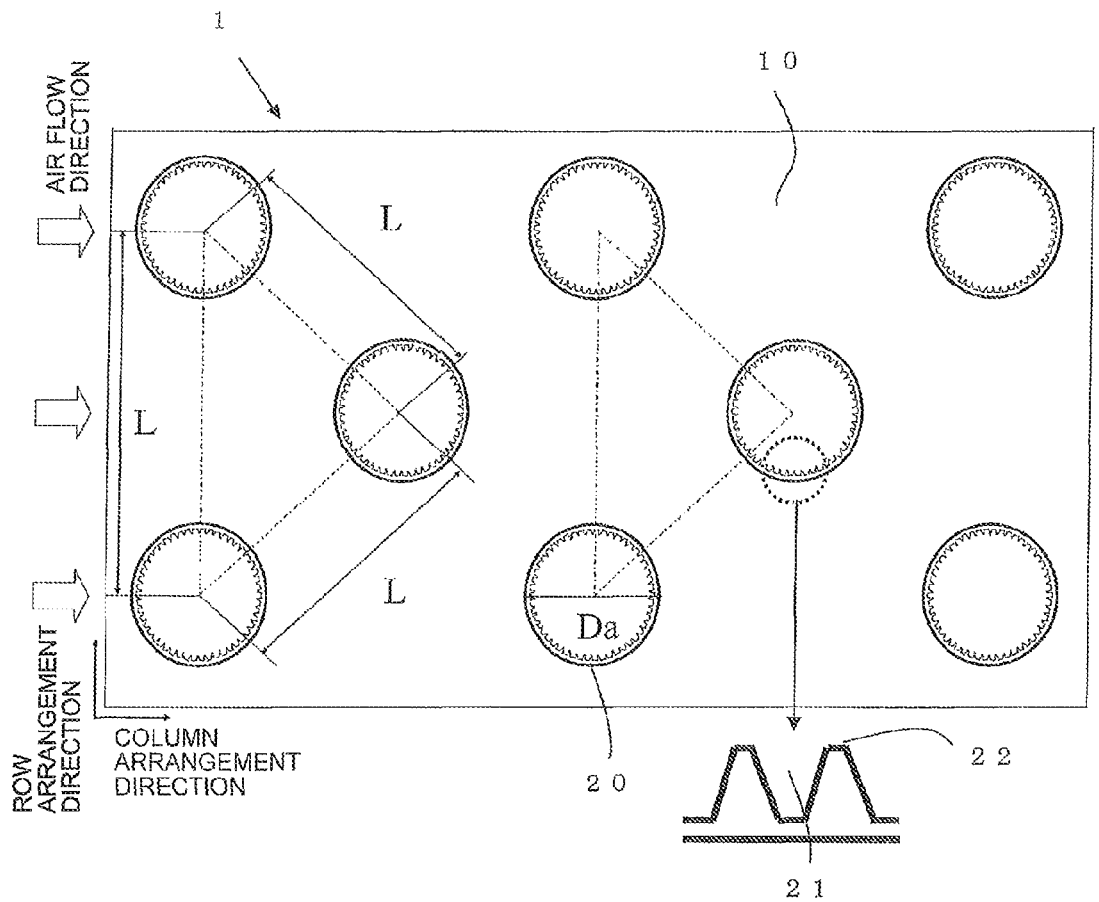
FIG. 3 is a diagram illustrating a heat exchanger in Embodiment 1 of the present invention.

FIG. 3 illustrates the heat exchanger in Embodiment 1 of the present invention. FIG. 3 illustrates a part of the cross section of the heat exchanger 1 when viewed from one side. FIG. 3 further illustrates an enlarged view illustrating grooves arranged on an inner surface of the heat transfer tube 20.

The heat exchanger 1 includes a plurality of fins 10 and a plurality of heat transfer tubes 20.

The fins 10 are spaced apart from each other such that gas (e.g., air) flows through spaces defined by the fins 10.

A medium (e.g., refrigerant) flows through the heat transfer tubes 20.

The heat transfer tubes 20 are arranged in multiple rows in a row arrangement direction intersecting a flow direction (air flow direction) of the gas. Furthermore, the heat transfer tubes 20 are arranged in five or more columns in a column arrangement direction along the flow direction (air flow direction) of the gas.

In addition, the heat transfer tubes 20 are arranged in, for example, a staggered pattern. The term staggered pattern as used herein refers to a pattern in which a set of the heat transfer tubes 20 on a column does not align, in the row arrangement direction, with another set of the heat transfer tubes 20 on a column adjacent to the column. In other words, the heat transfer tubes 20 are staggered such that the heat transfer tubes 20 of two adjacent columns are not in line in the row arrangement direction. For example, the middle of an interval between two adjacent heat transfer tubes 20 in the row arrangement direction is at the same level as the heat transfer tube 20 in the next column.

When the heat exchanger 1 is used as at least one of an evaporator and a condensor of the refrigeration cycle apparatus, the heat transfer tubes 20 are included in the refrigerant circuit in the refrigeration cycle apparatus.

The heat exchanger 1 exchanges heat between the refrigerant flowing through the heat transfer tubes 20 and the air passing through the spaces defined by the fins 10.

As described above, the heat exchanger 1 transfers heat (heating energy or cooling energy) inside the heat transfer tubes 20 to the air via the fins 10 and accordingly has a wide heat transfer area, serving as a surface in contact with the air. Thus, heat can be effectively exchanged between the refrigerant and the air.

The fins 10 and the heat transfer tubes 20 are composed of, for example, copper-containing metal, such as copper or copper alloy.

For example, the fins 10 are composed of oxygen-free copper (Japanese Industrial Standards (JIS): C1020). For example, the heat transfer tubes 20 are composed of oxygen-free copper having higher deformation resistance than the material of the fins 10.

Copper-containing metal has high conductivity and also has low deformation resistance. Accordingly, joining the heat transfer tubes 20 to the fins 10 by mechanical tube expansion ensures good contact between the heat transfer tubes 20 and the fins 10, thus providing the heat exchanger 1 having high efficiency.

The material of the fins 10 and the heat transfer tubes 20 is not limited to copper-containing metal. The fins 10 and the heat transfer tubes 20 may be composed of any metal, such as aluminum.

The heat transfer tubes 20 each have on their inner surfaces a plurality of grooves 21 extending axially and a plurality of protrusions 22, each of which is disposed between two adjacent grooves 21. Arranging the grooves 21 increases the area of contact between the refrigerant and the inner surface of the heat transfer tube 20, thus further improving the heat transfer performance.

The grooves 21 may be spiral grooves having a predetermined lead angle or straight grooves.

The unexpanded outside diameter of each of the heat transfer tubes 20 is, for example, 3 mm≤D≤6 mm.

The heat transfer tubes 20 satisfy the relationship of 1.055D≤Da≤1.068D, where D is the unexpanded outside diameter and Da is the expanded outside diameter.

Figure 4:
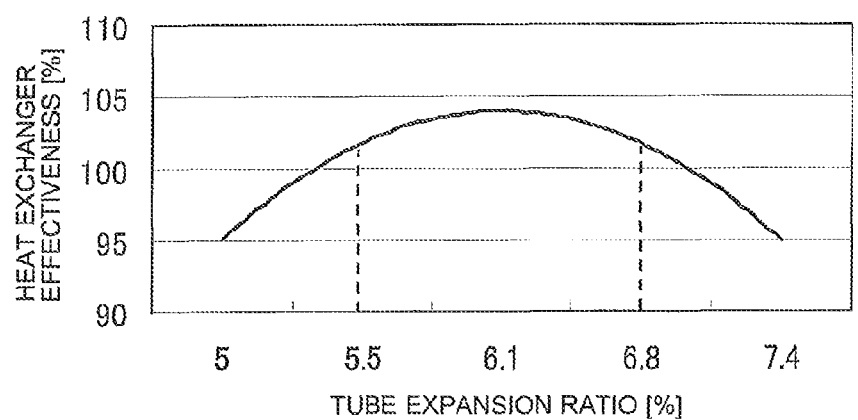
FIG. 4 is a diagram illustrating the relationship between a tube expansion ratio of heat transfer tubes of the heat exchanger and heat exchanger effectiveness.

FIG. 4 is a diagram illustrating the relationship between a tube expansion ratio of the heat transfer tubes of the heat exchanger and heat exchanger effectiveness.

FIG. 4 illustrates the relationship between the tube expansion ratio of the heat transfer tubes 20 and the heat exchanger effectiveness relative to the heat exchanger effectiveness (100%) of a conventional heat exchanger. FIG. 4 illustrates a case of the heat transfer tubes 20 arranged in five columns.

The term tube expansion ratio as used herein refers to the ratio of the expanded outside diameter Da to the unexpanded outside diameter D, and is expressed as the tube expansion ratio=(Da/D−1)×100 [%].

As shown in FIG. 4, an excessively high tube expansion ratio reduces the heat exchanger effectiveness. The reason is that an increase in tube expansion ratio causes the amount of tops of the protrusions 22 crushed by the expanding ball 30 to increase, thus reducing the area of heat transfer of the inner surface of each heat transfer tube 20. In addition, the increase in tube expansion ratio causes, for example, a crack or deformation of the fin collars 11, thus reducing the degree of contact between the heat transfer tube 20 and the fins 10.

On the other hand, an excessively low tube expansion ratio reduces the heat exchanger effectiveness. The reason is that a low tube expansion ratio causes poor contact between the outer surface of the heat transfer tube 20 and the fins 10, leading to a reduction in the degree of contact between the heat transfer tube 20 and the fins 10.

For the above-described reasons, the tube expansion ratio has to be set to a value that allows the heat exchanger effectiveness to be increased (greater than or equal to 100%) relative to that of the conventional heat exchanger. Considering, for example, product-to-product variations, it is preferred to satisfy the relationship of 5.5 the tube expansion ratio 6.8, as illustrated in FIG. 4. In other words, it is preferred that the heat transfer tubes 20 satisfy the relationship of 1.055D≤Da≤1.068D.

Consequently, a reduction in the degree of contact between the outer surfaces of the heat transfer tubes 20 and the fins 10 can be reduced. Furthermore, the heat exchanging capacity of the heat exchanger 1 can be enhanced. Thus, the heat exchanger 1 having high efficiency can be provided. The efficiency of the refrigeration cycle apparatus, therefore, can be increased.

When a distance between the centers of two adjacent heat transfer tubes 20 is defined as L, the heat transfer tubes 20 satisfy the relationship of 1.56Da≤L≤2.58Da.

Each of the fins 10 is flat and panel-shaped, and continuously extends between the heat transfer tubes 20 in the row arrangement direction. In other words, each fin continuously extends in the row arrangement direction without any cut, such as a slit. Furthermore, each of the fins 10 continuously extends between the heat transfer tubes 20 in the column arrangement direction. In other words, each fin continuously extends in the column arrangement direction without any cut, such as a cut for heat rejection. Each fin may continuously extend in at least one of the row arrangement direction and the column arrangement direction.

Figure 5:
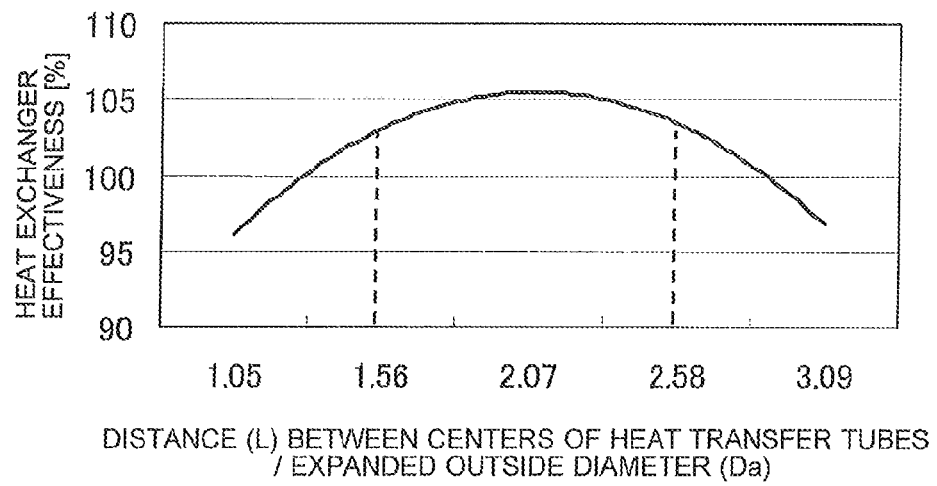
FIG. 5 is a diagram illustrating the relationship between a distance L between the centers of two adjacent heat transfer tubes of the heat exchanger and the heat exchanger effectiveness.

FIG. 5 is a diagram illustrating the relationship between the distance L between the centers of the heat transfer tubes of the heat exchanger and the heat exchanger effectiveness.

FIG. 5 illustrates the relationship between the ratio (L/Da) of the distance L between the centers of the heat transfer tubes to the expanded outside diameter Da and the heat exchanger effectiveness relative to the heat exchanger effectiveness (100%) of the conventional heat exchanger. The distance L is a distance between the centers of two adjacent heat transfer tubes 20 as illustrated in FIG. 3. FIG. 5 illustrates a case of the heat transfer tubes 20 arranged in five columns.

As shown in FIG. 5, an excessively high ratio L/Da reduces the heat exchanger effectiveness. The reason is that an excessively high ratio L/Da causes partial deformation of the fin 10 between the heat transfer tubes 20, resulting in a reduction in the degree of contact between the fin 10 and the heat transfer tubes 20.

On the other hand, an excessively low ratio L/Da reduces the heat exchanger effectiveness. The reason is that, at an excessively low ratio L/Da, an increase in air draft resistance is larger than fin efficiency. Such an increase in draft resistance will hinder an improvement in annual performance factor (APF).

For the above-described reasons, the ratio L/Da has to be set to a value that allows the heat exchanger effectiveness to be increased (greater than or equal to 100%) relative to that of the conventional heat exchanger. Considering, for example, product-to-product variations, it is preferred to satisfy the relationship of 1.56Da≤L≤2.58Da, as illustrated in FIG. 5.

Consequently, a reduction in the degree of contact between the outer surfaces of the heat transfer tubes 20 and the fins 10 can be reduced. Furthermore, the heat exchanging capacity of the heat exchanger 1 can be enhanced. Thus, the heat exchanger 1 having high efficiency can be provided. The efficiency of the refrigeration cycle apparatus, therefore, can be increased.

In addition, arranging the heat transfer tubes 20 in five or more columns in the column arrangement direction further enhances the effect of increasing the degree of contact between the heat transfer tubes 20 and the fins 10 of the heat exchanger 1, thus achieving a significant increase in heat exchanger effectiveness.

Specifically, in the arrangement of the heat transfer tubes 20 of five or more columns in the column arrangement direction, the heat transfer tubes 20 are arranged such that each of three or more columns except for two columns at both ends in the column arrangement direction is arranged between adjacent columns on both sides.

For the heat transfer tubes 20 in each column between the adjacent columns (or intermediate-column heat transfer tubes 20), expanding the heat transfer tubes 20 in the adjacent columns causes a force pressing their surrounding parts of the fin 10 toward the centers of the intermediate-column heat transfer tubes 20, thus increasing the degree of contact between the outer surfaces of the heat transfer tubes 20 and the fin 10.

For the heat transfer tubes 20 in each of the two columns at both the ends (or end-column heat transfer tubes 20), a force pressing their surrounding parts of the fin 10 is applied from only the next column of the heat transfer tubes 20. The degree of contact between the outer surfaces of the end-column heat transfer tubes 20 and the fin 10 is accordingly lower than that between the outer surfaces of the intermediate-column heat transfer tubes 20 and the fin 10.

For the above-described reasons, arranging the heat transfer tubes 20 in five or more columns in the column arrangement direction allows more than half of the columns to be intermediate columns. Thus, more intermediate-column heat transfer tubes 20 are arranged than end-column heat transfer tubes 20. Consequently, a proportion of heat transfer tubes 20 having outer surfaces in good contact with the fins 10 is high. Thus, the heat exchanger effectiveness of the heat exchanger 1 is increased.

Embodiment 2

In Embodiment 2, the relationship between the number of protrusions, indicating the sum of protrusions 22 of a heat transfer tube 20 of a heat exchanger 1, and heat exchanger effectiveness will be described.

The configuration of the heat exchanger 1 in Embodiment 2 is the same as that in Embodiment 1 described above. The same components as those in Embodiment 1 are designated by the same reference signs.

A plurality of heat transfer tubes 20 each have on their inner surfaces a plurality of grooves 21 extending axially and the protrusions 22. Each protrusion 22 is disposed between two adjacent grooves 21. The heat transfer tubes 20 satisfy the relationship of $6.66D \leq N \leq 10D$, where N is the number of protrusions indicating the sum of the protrusions 22. The value D is expressed in units of mm.

Figure 6:
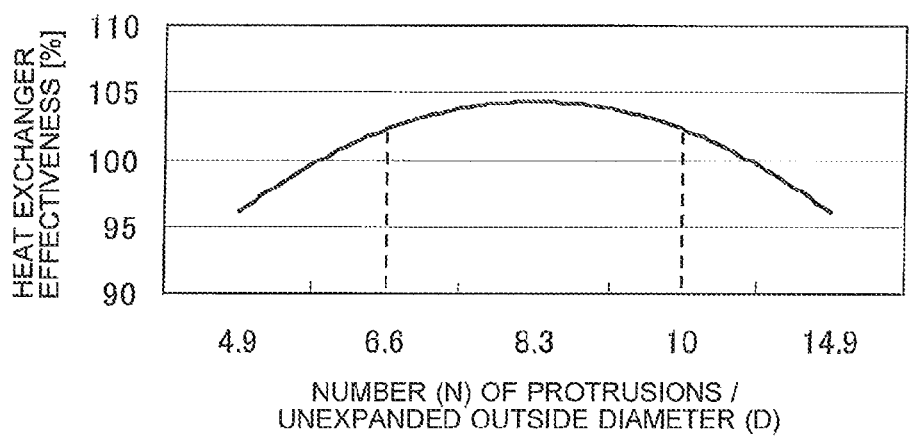
FIG. 6 is a diagram illustrating the relationship between the number of protrusions, indicating the sum of protrusions of the heat transfer tube of the heat exchanger, and the heat exchanger effectiveness.

FIG. 6 is a diagram illustrating the relationship between the number of protrusions, indicating the sum of the protrusions of the heat transfer tube of the heat exchanger and the heat exchanger effectiveness.

FIG. 6 illustrates the relationship between the ratio (N/D) of the number N of protrusions to the unexpanded outside diameter D relative to the heat exchanger effectiveness (100%) of the conventional heat exchanger.

As the number N of the protrusions 22 each disposed between the grooves 21 is larger, the heat transfer area of the inner surface of the heat transfer tube 20 is larger. As illustrated in FIG. 6, however, an excessively high ratio N/D reduces the heat exchanger effectiveness. The reason is that an excessively high ratio N/D reduces the cross-sectional area of the grooves 21. A refrigerant liquid membrane overflows from the grooves 21 and covers the tops of the protrusions 22. In other words, the effect of increasing the area of contact between the refrigerant and the inner surface of the heat transfer tube 20 cannot be achieved.

On the other hand, an excessively low ratio N/D reduces the heat exchanger effectiveness. The reason is that an excessively low ratio N/D reduces the number of grooves 21, resulting in a reduction in heat transfer area of the inner surface of the heat transfer tube 20. In other words, the effect of increasing the area of contact between the refrigerant and the inner surface of the heat transfer tube 20 cannot be achieved.

For the above-described reasons, the ratio N/D has to be set to a value that allows the heat exchanger effectiveness to be increased (greater than or equal to 100%) relative to that of the conventional heat exchanger. Considering, for example, product-to-product variations, it is preferred to satisfy the relationship of $6.66D \leq N \leq 10D$ as illustrated in FIG. 6.

Consequently, the heat transfer area of the heat transfer tubes 20 can be increased, thus increasing the heat transfer rate. Additionally, the heat exchanging capacity of the heat exchanger 1 can be enhanced. Thus, the heat exchanger 1 having high efficiency can be provided. The efficiency of a refrigeration cycle apparatus, therefore, can be increased.

Embodiment 3

In Embodiment 3, the relationship between a fin pitch in a fin arrangement direction of fins 10 and heat exchanger effectiveness will be described.

The configuration of a heat exchanger 1 in Embodiment 3 is the same as that in Embodiment 1 described above. The same components as those in Embodiment 1 are designated by the same reference signs.

The fins 10 satisfy the relationship of $0.3D \leq Fp \leq 0.58D$, where Fp is the fin pitch that is the distance between two adjacent fins 10.

Figure 7:
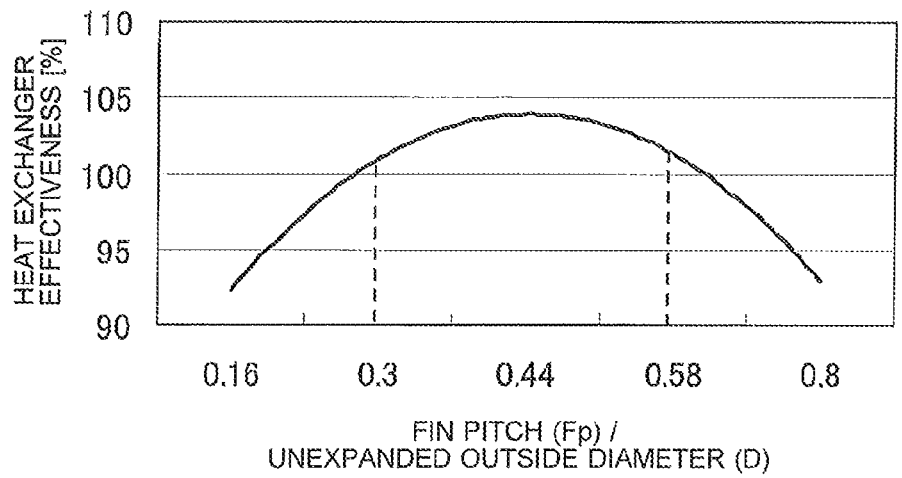
FIG. 7 is a diagram illustrating the relationship between a fin pitch Fp of fins in a fin arrangement direction of the heat exchanger and the heat exchanger effectiveness.

FIG. 7 is a diagram illustrating the relationship between the fin pitch Fp of the fins in the fin arrangement direction of the heat exchanger and the heat exchanger effectiveness.

FIG. 7 illustrates the relationship between the ratio (Fp/D) of the fin pitch Fp to the unexpanded outside diameter D and the heat exchanger effectiveness relative to the heat exchanger effectiveness (100%) of the conventional heat exchanger.

Increasing the fin pitch Fp reduces the draft resistance of air passing through spaces defined by the fins 10. Consequently, the rate of air flow can be increased without increasing driving force to a fan that supplies air to the heat exchanger 1, thus increasing the heat exchanger effectiveness of the heat exchanger 1.

As illustrated in FIG. 7, however, an excessively high ratio Fp/D reduces the heat exchanger effectiveness. The reason is that an excessively high ratio Fp/D reduces the heat transfer area of the fins 10.

On the other hand, an excessively low ratio Fp/D reduces the heat exchanger effectiveness. The reason is that, although an excessively low ratio Fp/D increases the heat transfer area of the fins 10, the draft resistance of air passing through the spaces defined by the fins 10, resulting in a reduction in air flow rate.

For the above-described reasons, the ratio Fp/D has to be set to a value that allows the heat exchanger effectiveness to be increased (greater than or equal to 100%) relative to that of the conventional heat exchanger. Considering, for example, product-to-product variations, it is preferred to satisfy the relationship of $0.3D \leq Fp \leq 0.58D$ as illustrated in FIG. 7.

Consequently, the heat exchanger effectiveness of the heat exchanger 1 can be increased. In addition, the heat exchanging capacity of the heat exchanger 1 can be enhanced. Thus, the heat exchanger 1 having high efficiency can be provided. The efficiency of a refrigeration cycle apparatus, therefore, can be increased.

Embodiment 4

In Embodiment 4, the relationship between the thickness of a fin 10 and heat exchanger effectiveness will be described.

The configuration of a heat exchanger 1 in Embodiment 4 is the same as that in Embodiment 1 described above. The same components as those in Embodiment 1 are designated by the same reference signs.

A plurality of fins 10 satisfy the relationship of $0.026D \le Ft \le 0.037D$, where Ft is the thickness of the fins 10 in the fin arrangement direction.

Figure 8:
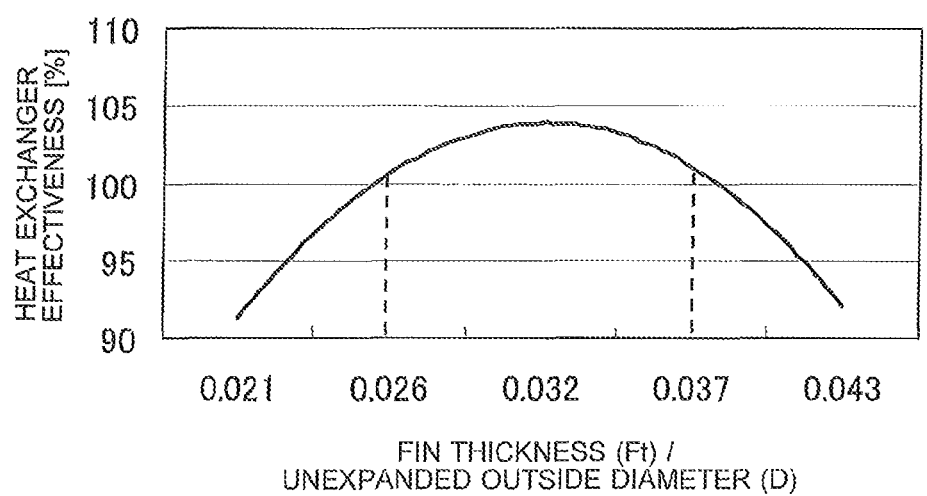
FIG. 8 is a diagram illustrating the relationship between the thickness Ft of the fin of the heat exchanger and the heat exchanger effectiveness.

FIG. 8 is a diagram illustrating the relationship between the thickness Ft of the fin of the heat exchanger and the heat exchanger effectiveness.

FIG. 8 illustrates the relationship between the ratio (Ft/D) of the thickness Ft of the fin 10 to the unexpanded outside diameter D relative to the heat exchanger effectiveness (100%) of the conventional heat exchanger.

Reducing the thickness Ft of each fin 10 reduces the draft resistance of air passing through spaces defined by the fins 10. Consequently, the rate of the air flow can be increased without increasing driving force to a fan that supplies air to the heat exchanger 1, thus increasing the heat exchanger effectiveness of the heat exchanger 1.

As illustrated in FIG. 8, however, an excessively low ratio Ft/D reduces the heat exchanger effectiveness. The reason is that an excessively low ratio Ft/D reduces the heat transfer performance of the fins 10, resulting in a reduction in fin efficiency.

On the other hand, an excessively high ratio Ft/D reduces the heat exchanger effectiveness. The reason is that, although an excessively high ratio Ft/D increases the heat transfer performance of the fins 10, the draft resistance of air passing through the spaces defined by the fins 10, resulting in a reduction in air flow rate.

For the above-described reasons, the ratio Ft/D has to be set to a value that allows the heat exchanger effectiveness to be increased (greater than or equal to 100%) relative to that of the conventional heat exchanger. Considering, for example, product-to-product variations, it is preferred to satisfy the relationship of $0.026D \le Ft \le 0.037D$ as illustrated in FIG. 8.

Consequently, the heat exchanger effectiveness of the heat exchanger 1 can be increased. In addition, the heat exchanging capacity of the heat exchanger 1 can be enhanced. Thus, the heat exchanger 1 having high efficiency can be provided. The efficiency of a refrigeration cycle apparatus, therefore, can be increased.

The configurations of Embodiments 1 to 4 described above may be combined in any combination. In such a configuration, the heat exchanger effectiveness of the heat exchanger 1 can be increased. In addition, the heat exchanging capacity of the heat exchanger 1 can be enhanced. Thus, the heat exchanger 1 having high efficiency can be provided.

In Embodiments 1 to 4, the air-conditioning apparatus has been described as an example of the refrigeration cycle apparatus according to the present invention. The present invention is not limited to this example. The present invention can be applied to any other refrigeration cycle apparatuses, such as a refrigeration apparatus and a heat pump apparatus, each including a refrigerant circuit that includes a heat exchanger functioning as an evaporator or a condensor.

REFERENCE SIGNS LIST 1 heat exchanger 2 indoor side heat exchanger 3 outdoor side heat exchanger 5 compressor 7 expansion valve 8 four-way valve 10 fin
11 fin collar 20 heat transfer tube 21 groove 22 protrusion 30 expanding ball 31 rod

The invention claimed is:
1. A heat exchanger comprising:
a plurality of fins spaced apart from each other such that gas flows through spaces defined by the plurality of fins; and
a plurality of heat transfer tubes having a plurality of grooves extending axially on an inner surface and a plurality of protrusions, wherein each protrusion is located between two adjacent ones of the grooves, wherein the heat transfer tubes extend through the plurality of fins and are joined to the plurality of fins by tube expansion,
wherein the heat transfer tubes are arranged in five or more columns in a column arrangement direction along a flow direction of the gas and are arranged in a staggered pattern in a row arrangement direction, which intersects the flow direction of the gas,
wherein each of fins of the plurality of fins is flat and plate-shaped and extends continuously between the heat transfer tubes in the column arrangement direction without any cut,
wherein the plurality of heat transfer tubes satisfies relationships of
$1.055D \le Da \le 1.068D$,
$1.56Da \le L \le 2.58Da$, and
$6.66D \le N \le 10D$,
where D is expressed in units of mm,
where D is an unexpanded outside diameter of each of the heat transfer tubes of the plurality of heat transfer tubes, Da is an expanded outside diameter thereof, L is a distance between centers of two adjacent ones of the heat transfer tubes, and N is a number of the protrusions and indicates a sum of the protrusions in the plurality of protrusions, and
wherein the plurality of fins satisfies a relationship of
$0.3D \le Fp \le 0.58D$, and
$0.026D \le Ft \le 0.037D$,
where Fp is a fin pitch that is a distance between two adjacent ones of the fins of the plurality of fins, and Ft is a thickness of each of the fins of the plurality of fins.
2. The heat exchanger of claim 1, wherein the plurality of fins and the plurality of heat transfer tubes are composed of copper-containing metal.
3. The heat exchanger of claim 1,
wherein the heat transfer tubes are arranged in multiple rows in the row arrangement direction intersecting the flow direction of the gas, and
wherein each of the fins is flat and plate-shaped and continuously extends between the plurality of heat transfer tubes in the row arrangement direction.
4. The heat exchanger of claim 1, wherein the plurality of heat transfer tubes satisfies a relationship of $3 \text{ mm} \le D \le 6 \text{ mm}$.
5. A refrigeration cycle apparatus comprising:
a refrigerant circuit through which refrigerant is circulated, the refrigerant circuit sequentially connecting, by pipes, a compressor, a condensor, an expansion unit, and an evaporator,
at least one of the condensor and the evaporator being the heat exchanger of claim 1.
6. The refrigeration cycle apparatus of claim 5, wherein the refrigerant is any of a single-component refrigerant of HC, a refrigerant mixture containing HC, R32, R410A, R407C, carbon dioxide, R1234yf, a refrigerant mixture containing at least R1234yf, R1234ze, and a refrigerant mixture containing at least R1234ze.
7. A method of manufacturing a heat exchanger, the method comprising:

inserting a plurality of heat transfer tubes having a plurality of grooves extending axially on an inner surface and a plurality of protrusions, wherein each protrusion is located between two adjacent ones of the grooves, into a plurality of fins spaced apart from each other; and expanding the plurality of heat transfer tubes and joining the plurality of heat transfer tubes to the plurality of fins, wherein the plurality of fins and the plurality of heat transfer tubes are composed of copper-containing metal, wherein the plurality of heat transfer tubes satisfies relationships of $1.055D \leq Da \leq 1.068D$,
$1.56Da \leq L \leq 2.58Da$, and
$6.66D \leq N \leq 10D$, where D is expressed in units of mm, where D is an unexpanded outside diameter of each of the heat transfer tubes of the plurality of heat transfer tubes, Da is an expanded outside diameter thereof, L is a distance between centers of two adjacent ones of the heat transfer tubes, and N is a number of the protrusions and indicates a sum of the protrusions in the plurality of protrusions, wherein the plurality of fins satisfies a relationship of $0.3D \leq Fp \leq 0.58D$, and
$0.026D \leq Ft \leq 0.037D$, where Fp is a fin pitch, which is a distance between two adjacent ones of the fins of the plurality of fins, and Ft is a thickness of each of the fins of the plurality of fins.

* * * * *